(12) United States Patent
Bailey

(10) Patent No.: US 12,523,370 B2
(45) Date of Patent: Jan. 13, 2026

(54) CONTINUOUS FLOW STEAM BOILER UTILISING SEAWATER AS FEEDSTOCK

(71) Applicant: James Leslie Bailey, Sydney (AU)

(72) Inventor: James Leslie Bailey, Sydney (AU)

( * ) Notice: Subject to any disclaimer, the term of this patent is extended or adjusted under 35 U.S.C. 154(b) by 396 days.

(21) Appl. No.: 18/018,497

(22) PCT Filed: Jul. 28, 2021

(86) PCT No.: PCT/AU2021/050823
§ 371 (c)(1),
(2) Date: Jan. 27, 2023

(87) PCT Pub. No.: WO2022/020895
PCT Pub. Date: Feb. 3, 2022

(65) Prior Publication Data
US 2023/0288055 A1    Sep. 14, 2023

(30) Foreign Application Priority Data

Jul. 29, 2020  (AU) ................................. 2020902660
Dec. 21, 2020  (AU) ................................. 2020904777
Feb. 11, 2021  (AU) ................................. 2021900339

(51) Int. Cl.
*F22B 1/28*    (2006.01)
*F22B 37/30*   (2006.01)

(52) U.S. Cl.
CPC ............... *F22B 1/28* (2013.01); *F22B 37/30* (2013.01)

(58) Field of Classification Search
CPC .................................. F22B 1/28; F22B 37/30
USPC ....................................................... 126/344
See application file for complete search history.

(56) References Cited

U.S. PATENT DOCUMENTS

| 2003/0132095 A1 | 7/2003 | Kenet et al. |
| 2005/0006491 A1 | 1/2005 | Lin |
| 2012/0085635 A1 | 4/2012 | Haynes |
| 2019/0352194 A1* | 11/2019 | Thiers ...................... C02F 1/28 |

FOREIGN PATENT DOCUMENTS

| CN | 204803030 U | 11/2015 |
| CN | 106256767 A | 12/2016 |

OTHER PUBLICATIONS

Li, Kai-Wen, Nov. 25, 2015, CN-204803030 translation.*
International Search Report and Written Opinion of PCT/AU2021/050823 dated Oct. 1, 2021, 17 pages.
Written Opinion of PCT/AU2021/050823 dated Jul. 4, 2022, 7 pages.

* cited by examiner

*Primary Examiner* — Avinash A Savani
(74) *Attorney, Agent, or Firm* — Rankin, Hill & Clark LLP

(57) ABSTRACT

An example boiler apparatus (501) for continuously processing water containing dissolved matter is disclosed. The boiler apparatus (501) including: a boiler vessel (515) with an inlet (523), a first outlet (517) and a second outlet (529). A third outlet (511) may also be provided. The boiler vessel (515) includes a heating element (522) located within the boiler vessel (515) arranged to provide a wet steam product at the first outlet (517) and/or third outlet (511) and create convection within the boiler vessel (515) such that a concentrated product is provided at the second outlet (529) which is relatively lower than the first outlet (517). A system including a boiler apparatus and related methods are also disclosed.

19 Claims, 6 Drawing Sheets

FIG 3      SSA = SEA SALT AEROSOLS

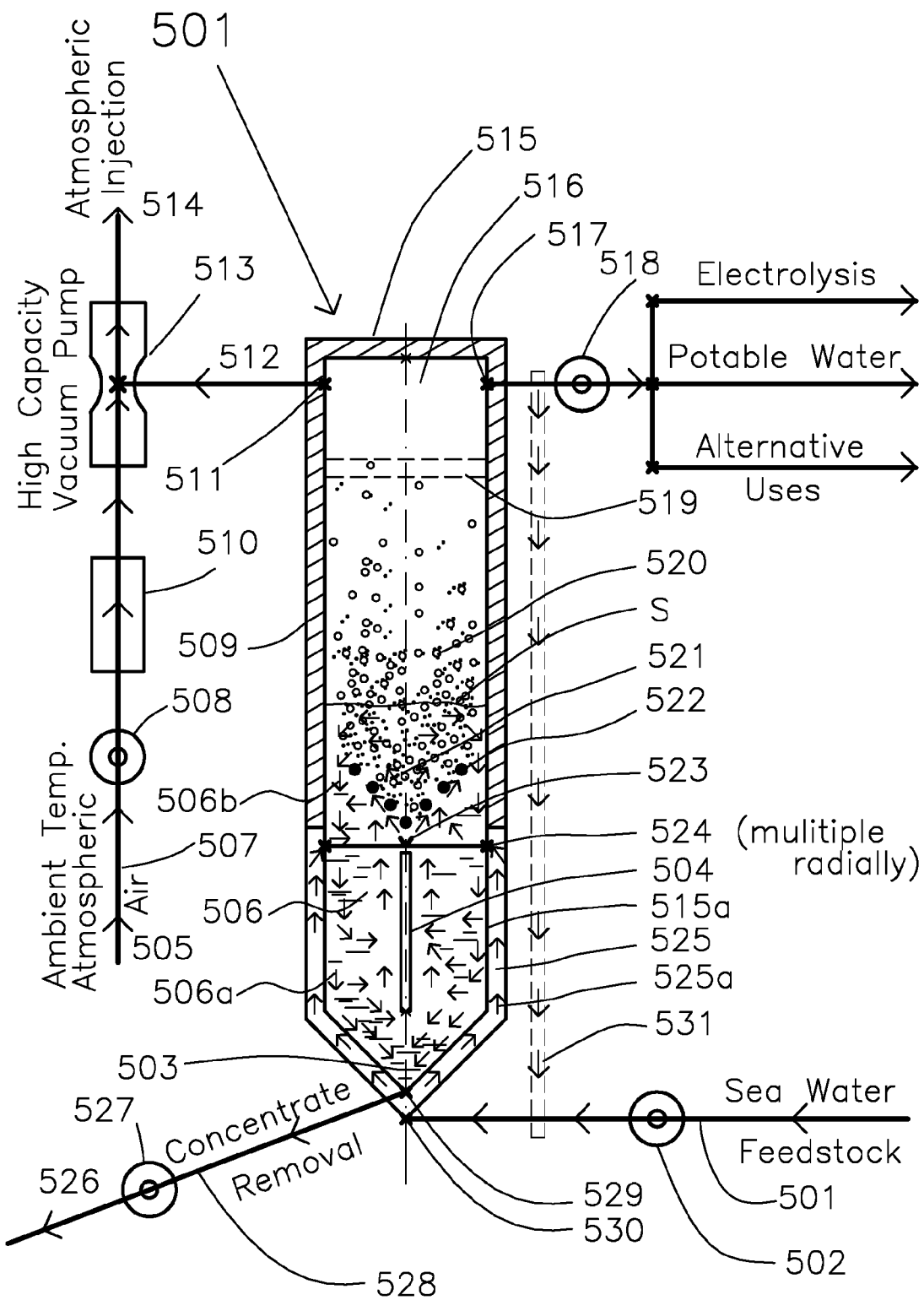
FIG 5 High Volume Air Version

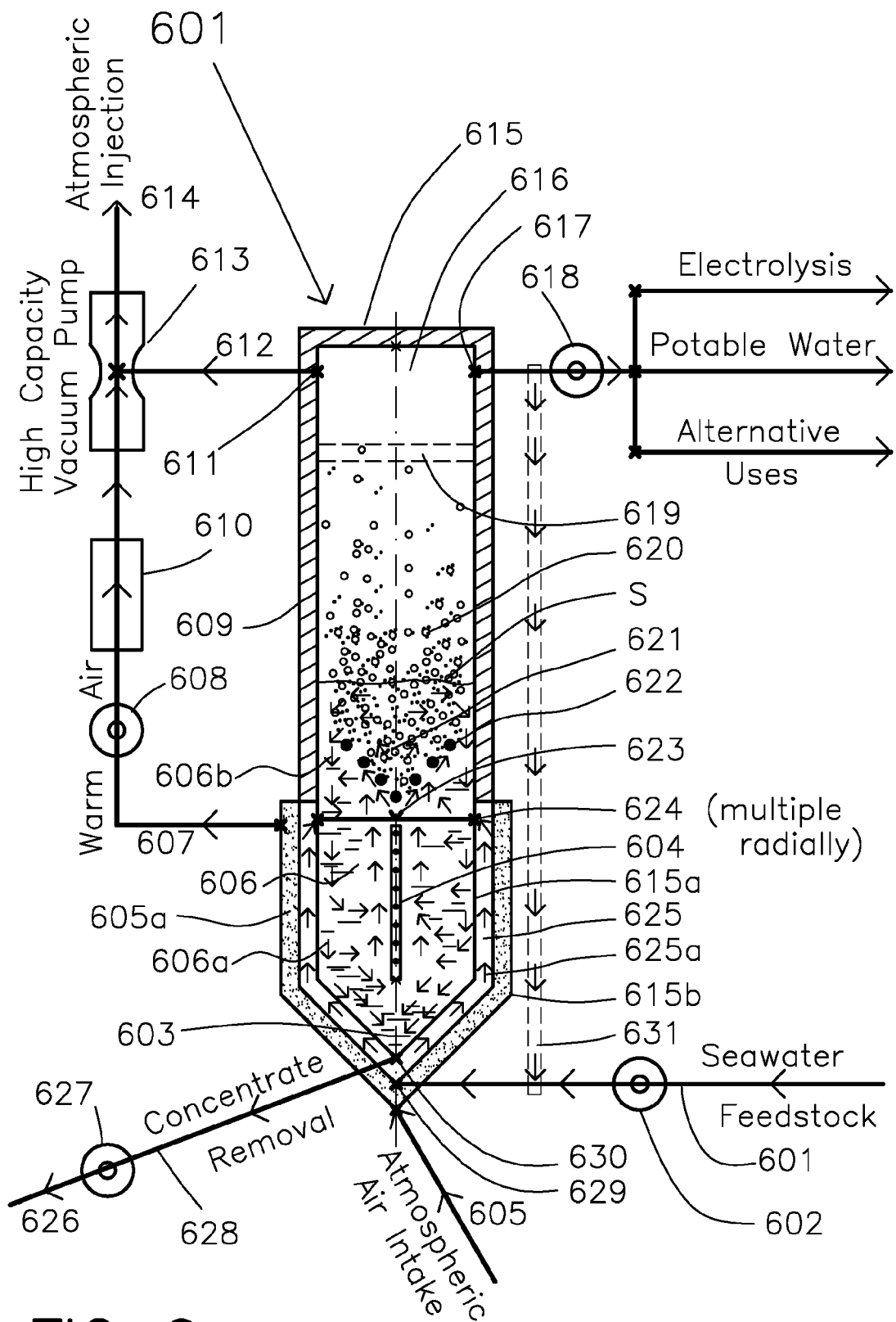
FIG 6 Air Heater Jacket Version

CONTINUOUS FLOW STEAM BOILER UTILISING SEAWATER AS FEEDSTOCK

RELATED APPLICATIONS

This application claims priority from Australian provisional patent application nos. AU 2020902660 filed on 29 Jul. 2020, AU 2020904777 filed on 21 Dec. 2020, and AU 2021900339 filed on 11 Feb. 2021, the contents of which are incorporated by reference.

TECHNICAL FIELD

The invention relates to a continuous flow steam boiler utilising seawater, or other dissolved contaminant feedwater or fluid, as feedstock as well as a system and a method including a continuous steam boiler.

BACKGROUND

Desalination technology has a long history, having evolved in various forms for specific purposes. For example, energy intensive thermal separation-multistage flash distillation is used on ships and for large scale desalination globally where cheap or waste energy can be utilised to advantage. Other variables such as quality of feedstock also affect choice of methodology.

Reportedly, about half of all large-scale desalination plants are of the Reverse Osmosis (RO) variety as they are cheaper to run but have high maintenance costs. Multi-Stage Flash (MSF) Steam desalination accounts for about one third of all large-scale desalination plants, reportedly. Many other technologies exist.

Traditional Multi-Stage Flash steam generators may prefer consistent energy input as temperature and pressure gradients across stages function best in a steady state and are generally less suited to variable solar power inputs.

To date, large scale industrial steam production boilers such as have been developed for steam locomotives or fossil fuelled electrical power stations generally are design-preferred to utilize the purest possible feed water from the environment to minimise concentrations of contaminants that contribute to undesirable deposits, scaling or corrosion.

Modern boiler technology producing high pressure steam for power generating turbines, often incorporates ceramic materials and coatings to minimise the adverse effects of contaminants. In best case scenarios where relatively clean feed water is taken from the environment, maintenance programs are required to clean the boiler apparatus frequently. Desalination of feedstock may be a pre-requisite.

The invention disclosed herein seeks to overcome one or more of the above identified problems or at least provide a useful alternative.

SUMMARY

In accordance with a first broad aspect there is provided, a boiler apparatus for continuously processing water containing dissolved matter, the boiler apparatus including: a boiler vessel with an inlet, a first outlet and a second outlet; and a heating element located within the boiler vessel, wherein the boiler vessel and heating element are arranged to provide a wet steam product at the first outlet and create convection within the boiler vessel such that a concentrated product is provided at the second outlet which is relatively lower than the first outlet. The boiler vessel may include a head space, a heating zone relatively below the headspace and a convection zone relatively below the heating zone, the heating zone including the heating element to provide the wet steam product to the headspace and the convection zone including one or more of a shape feature, a baffle and a further heating element to promote convection.

In an aspect, the head space is at least partially pressure reduced and may in some examples allow boiling of sea water at a temperature of about 70 degrees C.

In another aspect, the headspace is adapted to accumulate the wet steam product and the first outlet is located toward a top of the headspace.

In another aspect, the boiler apparatus includes an extraction pump in fluid communication with the first outlet.

In another aspect, the boiler vessel is shaped to promote convection.

In another aspect, the boiler vessel narrows toward its bottom end and the second outlet is located at the bottom end.

In another aspect, the boiler vessel includes the baffle arranged to promote convection.

In another aspect, the baffle at least partially vertically divides the boiler vessel.

In another aspect, the baffle terminates short of the second outlet providing a concentrate zone proximate to the second outlet.

In another aspect, the boiler vessel includes an array of heating elements located toward an upper portion of the boiler vessel and a baffle extending at least partially between an upper portion of the boiler vessel and a lower portion of the boiler vessel.

In another aspect, the boiler apparatus includes an outlet pump connect to the second outlet.

In another aspect, the input is arranged to discharge at a submerged location between a top and a bottom of the boiler vessel.

In another aspect, the input is arranged to discharge intermediate the top and bottom of the boiler vessel.

In another aspect, the inlet includes a solids removal filter.

In another aspect, the boiler apparatus includes a heat exchanger between the input and the second outlet.

In another aspect flow rates of the inlet, first outlet and second outlet are configured such that the boiler apparatus operates continuously.

In another aspect, the dissolved matter is or includes salt.

In another aspect the boiler vessel includes two outlets, being two of the first outlets, for the wet steam product.

In another aspect a headspace of the boiler vessel is maintained at a pressure lower than atmospheric pressure.

In another aspect the boiler vessel includes a heat exchanger about at least a lower section thereof.

In another aspect the heat exchanger includes a pipe in communication with the inlet, the pipe spiralling about at least a lower section of the boiler vessel.

In another aspect at least some of the heating elements are positioned within the boiler intermediate the heat exchanger so at to provide a thermal gradient between the heat exchanger and heating elements.

In another aspect the water containing dissolved matter passing through the heat exchanger prior to the inlet to preheat the water containing dissolved matter and cool a periphery of the boiler vessel.

In another aspect the lower section of the boiler apparatus at least one of openable and removeable.

In accordance with a second broad aspect there is provided, a system for providing desalinated water including a boiler apparatus as defined above and herein.

In accordance with a third broad aspect there is provided, a system for making rain including a boiler apparatus as defined above and herein and a venturi (or other high capacity vacuum pump) in communication with the outlet, the venturi (or other pump method) being adapted to introduce the wet steam output into an atmosphere air stream so as to produce a wetted air output capable of making rain.

In accordance with a fourth broad aspect there is provided, a method for providing a wet steam product and a concentrated product from water containing dissolved matter, the method including: continuously introducing the water containing dissolved matter into a boiler vessel; and heating the water to generate convection within the boiler vessel such that the concentrated product forms toward a lower portion of the boiler vessel and the wet steam product forms in a head space of the boiler vessel; continuously outputting the concentrated product and the wet steam product so as to maintain a substantially constant steady state volume in the boiler vessel.

In accordance with a fifth broad aspect there is provided, a method for providing a wet steam product and a concentrated product from water containing dissolved matter, the method including: Continuously introducing the water containing dissolved matter into a boiler vessel at an inlet zone; Heating the water at a heating zone to provide convection to create a separated zone having the concentrated product below the inlet zone and a head space with the wet steam above the inlet zone; and Continuously outputting concentrated product from the separated zone and the wet steam product from the head space so as to maintain a substantially constant steady state volume in the boiler vessel.

In accordance with a sixth broad aspect there is provided, a method for providing a wet steam product and a concentrated product from water containing dissolved matter, the method including: Continuously introducing the water containing dissolved matter into a boiler vessel at an inlet zone; Heating the water at a heating zone to provide convection to create a separated zone having the concentrated product below the inlet zone and a head space with the wet steam above the inlet zone; Maintaining a pressure less than atmospheric pressure in the head space; Continuously outputting concentrated product from the separated zone and the wet steam product from the head space so as to maintain a substantially constant steady state volume in the boiler vessel.

In accordance with a seventh broad aspect there is provided, a boiler apparatus for continuously processing a seawater feedstock the boiler apparatus including: a boiler vessel with a first inlet from which the seawater enters the boiler vessel, a second inlet for atmospheric air, two steam product outlets and a waste outlet; a heating element located within the boiler vessel; a first heat exchanger arranged to communicate heat between one of the two steam outlets and the seawater feedstock; and a second heat exchanger fitted to at least a lower section of the boiler vessel to communicate heat with the boiler vessel; wherein the boiler vessel and heating element are arranged to provide a wet steam product at the two steam product outlets and create convection within the boiler vessel such that a concentrated product is provided at the waste outlet which is relatively lower than the first outlet, and wherein the seawater feedstock is preheated by the first heat exchanger and then the second heat exchanger prior to entering the boiler vessel at the inlet; and wherein the atmospheric air is preheated by the second heat exchanger and then mixed with the wet steam product of the other of two steam product outlets to provide a wetted air stream.

In accordance with an eighth broad aspect there is provided, a system for making rain including a boiler apparatus as defined above and herein, and peripheral equipment including a pressure reducing device in communication with the outlet, the pressure reducing device being adapted to introduce the wet steam output into an atmosphere air stream so as to produce a wetted air output capable of making rain.

In accordance with an ninth broad aspect there is provided, boiler apparatus for continuously processing water containing dissolved matter, the boiler apparatus including: a boiler vessel with an inlet, a first outlet and a second outlet; and a heating element located within the boiler vessel, wherein the boiler vessel and heating element are arranged to provide a wet steam product at the first outlet and create convection within the boiler vessel such that a concentrated product is provided at the second outlet which is relatively lower than the first outlet.

In accordance with a tenth broad aspect, there is provided a method for making rain, the method including: continuously introducing water containing dissolved matter into a boiler vessel at an inlet zone; heating the water at a heating zone to provide convection to create a separated zone having the concentrated product below the inlet zone and a head space with wet steam above the inlet zone; continuously outputting concentrated product from the separated zone and the wet steam product from the head space so as to maintain a substantially constant steady state volume in the boiler vessel; and extracting using a pressure reducing device the wet steam from the head space so as to maintain a pressure less that atmospheric in the head space and introduce the wet steam into an air stream so as to provide a wetted air stream capable of making rain.

BRIEF DESCRIPTION OF THE FIGURES

The invention is described, by way of non-limiting example only, by reference to the accompanying figures, in which;

FIG. 5 is a diagrammatic view illustrating yet another example of the boiler apparatus and system adapted for high air volume and rain making; and FIG. 6 is a diagrammatic view illustrating yet another example of the boiler apparatus and system further includes a heat exchanger to pre-heat air.

DETAILED DESCRIPTION

Figure 1:
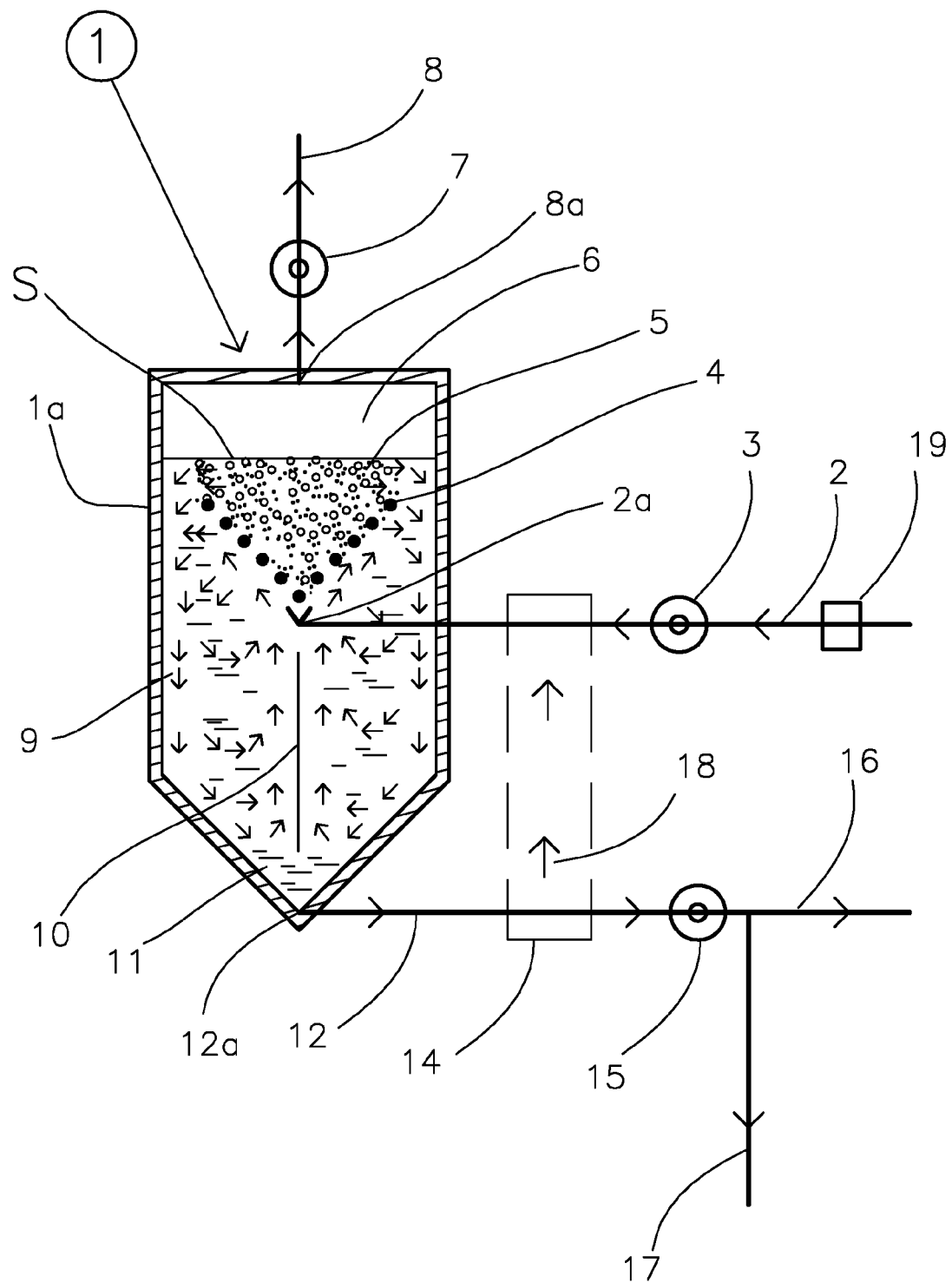
FIG. 1 is a diagrammatic view illustrating an example of a boiler apparatus and system.

Referring to FIG. 1, there is provided an example of a single stage boiler apparatus 1 for continuously processing a fluid such as water containing dissolved matter. The water may be, but not limited to, seawater or wastewater and the dissolved matter may be salt or other minerals. In this example, seawater is used as the example fluid.

The boiler apparatus 1 may include a boiler vessel 1a with an inlet 2a, a first outlet 8a and a second outlet 12a, and one or more heating elements 4 located within boiler vessel 1a. The boiler vessel 1a and the one or more heating elements 4 are arranged to provide a wet steam product 6 at the first outlet 8a and create convection, indicated by arrows 9, within the boiler vessel 1a such that a concentrate product 11 is provided at the second outlet 12a which is relatively lower than the first outlet 8a.

In more detail, the inlet 2a is connected to an intake pipe 2 with a pump 3 configured to deliver seawater through a solids' removal filter 19 to the most effective location within the vessel 1a near to the heating elements 4 whereby the seawater can be boiled most efficiently. In this example, the location of the inlet 2a is generally intermediate the vessel 1a and set below a typical surface "S" of the fluid within the boiler vessel 1a.

Within the boiler apparatus 1, the one or more heating elements 4 may be variously arranged to allow the convection currents 9 to deliver the denser concentrated salty water created by the boiling process to the bottom 11 of the boiler vessel 1a which may be considered a concentrate zone. Gravity also assists the concentration of relatively dense precipitates created, if any. A baffle 10 or similar may be provided and in some examples heated to facilitate the convection process. The denser concentrated salty water may then be extracted at the second outlet 12a. The baffle 10 may be centrally arranged and be posited below the one or more heating elements 4. The baffle 10 may terminate short of the concentrate zone at the bottom 11.

The wet steam 5 produced rises to the boiler vessel's upper chamber or head space 6 from where it can be extracted by at the first outlet 8a by pump 7 and delivered to intended usage via pipe 8. Pressure regulation of the vessel may be required. The rate of evaporation may be enhanced by the steam output pump 7 reducing the pressure in the chamber 6. The one or more heating elements 4 may be concentrated above the inlet 2a to create a boiling zone above the inlet 2a and below the upper chamber or head space 6. The one or more heating elements 4 may be provided in a Y shape in cross section, or other suitable shape. The boiling zone is above a convection zone substantially below the inlet 2a.

Boiler water level control would be maintained necessarily in a substantially steady state, achievable by means of balancing pump 3 seawater inflow and pump 15 concentrated seawater outflow pumping rate variations, as required.

Increased saltwater density due to boiling also contributes to concentrating the saltwater flow to where it can be removed substantially continuously from the base 11 of the boiler vessel 1a via pipe 12 and returned via pump 15 to the source of the feedwater, such as the ocean where the concentration would dissipate, or elsewhere as required.

Baffle(s) 10 may be used to facilitate convection currents and flow patterns depending upon the arrangement of heating elements 4. Heating elements in lieu of baffle 10 may be advantageous. As a result of the boiling process, the salt concentration increased solution is transported by convection currents, toward the bottom 11 of the vessel 1a from where it can be extracted optimally.

Preferably, the intake pipe 2 transports seawater via pump 3 through a preferred counter-flow heat exchanger 14, to the boiler vessel 1. The order of component arrangements may be varied to suit practical design parameters. Thermodynamic efficiency is maintained by means of an efficient counter-flow heat exchanger 14 to minimise heat energy losses at a portion of circulated fluid 18.

Some or all, of the removed concentrated salt water may be delivered to secondary or tertiary uses via pipe 17. Surplus concentrated salt water may be returned to the ocean or other source via pipe 16.

In order to use wet stream from the boiler apparatus 1 for secondary purposes that require the removal of some or practically, all of the Sea Salt Aerosols (SSA), then further treatment of the wet steam output may be required. Sea Salt Aerosols (SSA) which normally accompany water evaporating from an ocean for example, would also be present in the wet steam output of the primary stage of the boiler apparatus 1. Vertical elongation of the chamber 6 may facilitate reduction under gravity, of liquid droplets of concentrated feedwater being carried to the outlet 8a during vigorous boiling, such that the outlet 8a is located substantially beyond the reach of a splash zone.

In view of the above, it may be appreciated that the boiler apparatus 1 may involve single-stage flash distillation utilising the principles of convection to effect continuous separation of increasing salt concentrations from feedstock to allow continuous removal of concentrated dissolved and precipitated contaminant. Scaling from brine is minimised with preferred operating temperatures maintained below 70 degrees C. by means of pressure reduction.

Figure 3:
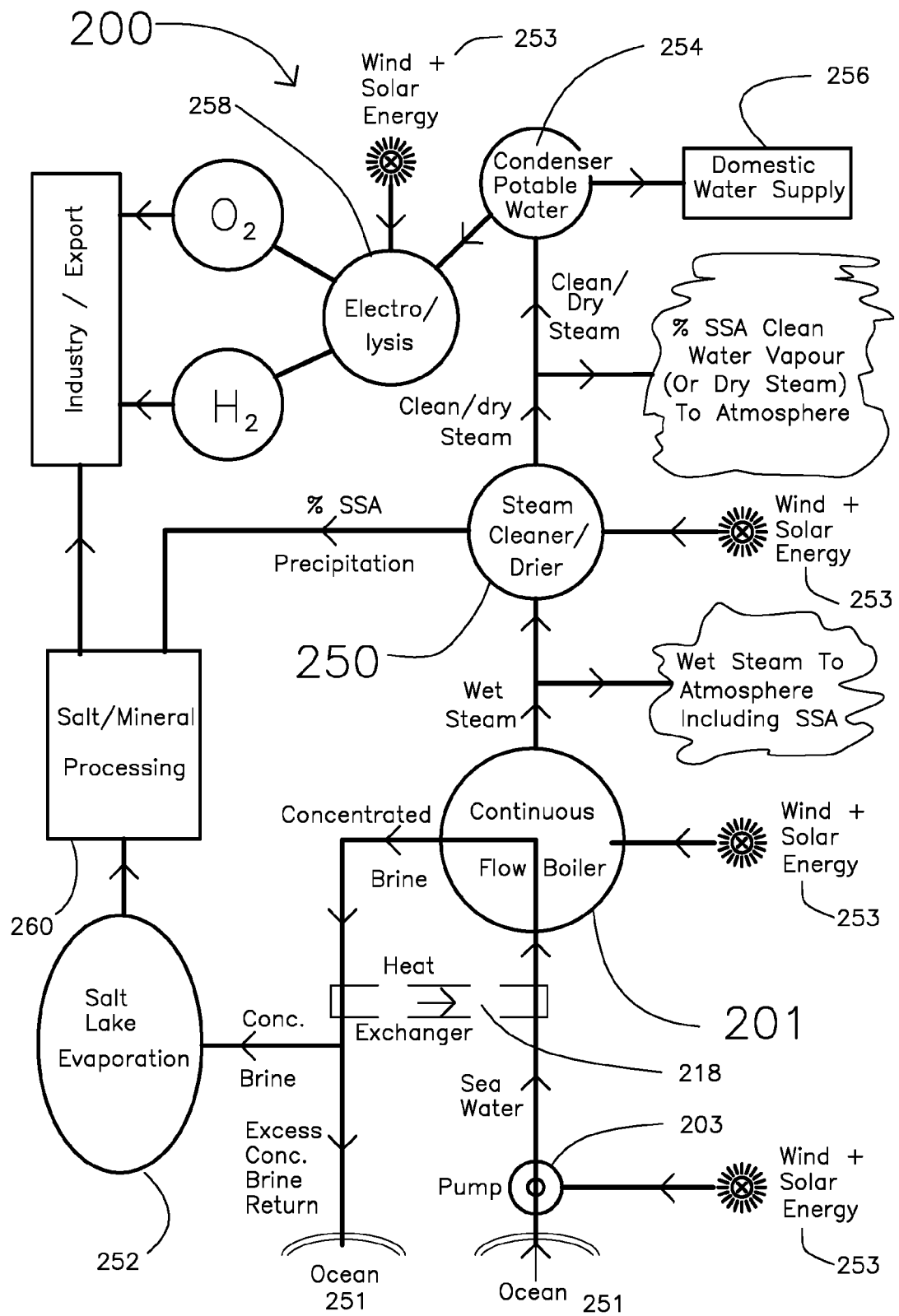
FIG. 3 is a diagrammatic view illustrating a system including a continuous steam boiler (single-stage flash steam generator) or other water vapour/steam creating device.

Referring to FIG. 3: Some potential applications of the invention, for example, may include: (a) injection into the lower atmosphere in a rainmaking program; (b) injection into the upper atmosphere to make solar energy reflecting ice as an Albedo increasing, global cooling program; (c) condensation for industrial usage such as domestic water supply, (d) electrolysis to produce hydrogen and oxygen for industrial usage, (e) any other usage requiring relatively pure water, may be achieved by a variety of methods.

Another method to produce a relatively high purity, but not absolutely pure wet steam, may be to utilize a second boiler apparatus. That is, wet steam output containing relatively large amounts of Sea Salt as aerosols (SSA) from a primary boiler, such as the boiler apparatus 1 shown in FIG. 1, may be quality improved by condensing the initial steam output and repeating the process in a second boiler. Multiple repeats of the continuous process in successive boilers would result in progressively higher purity output, if required.

As the condensed steam output from the first boiler would contain lower concentrations of Sea Salt than the feedstock then successive boiler processing, would produce relatively cleaner steam. Thus, condensate from a second processing may have a degree of purity satisfying potable water standards, suitability for electrolysis and other uses. If a higher degree of steam purity is deemed necessary for specific purposes, then the process could be further repeated as required.

Figure 2:
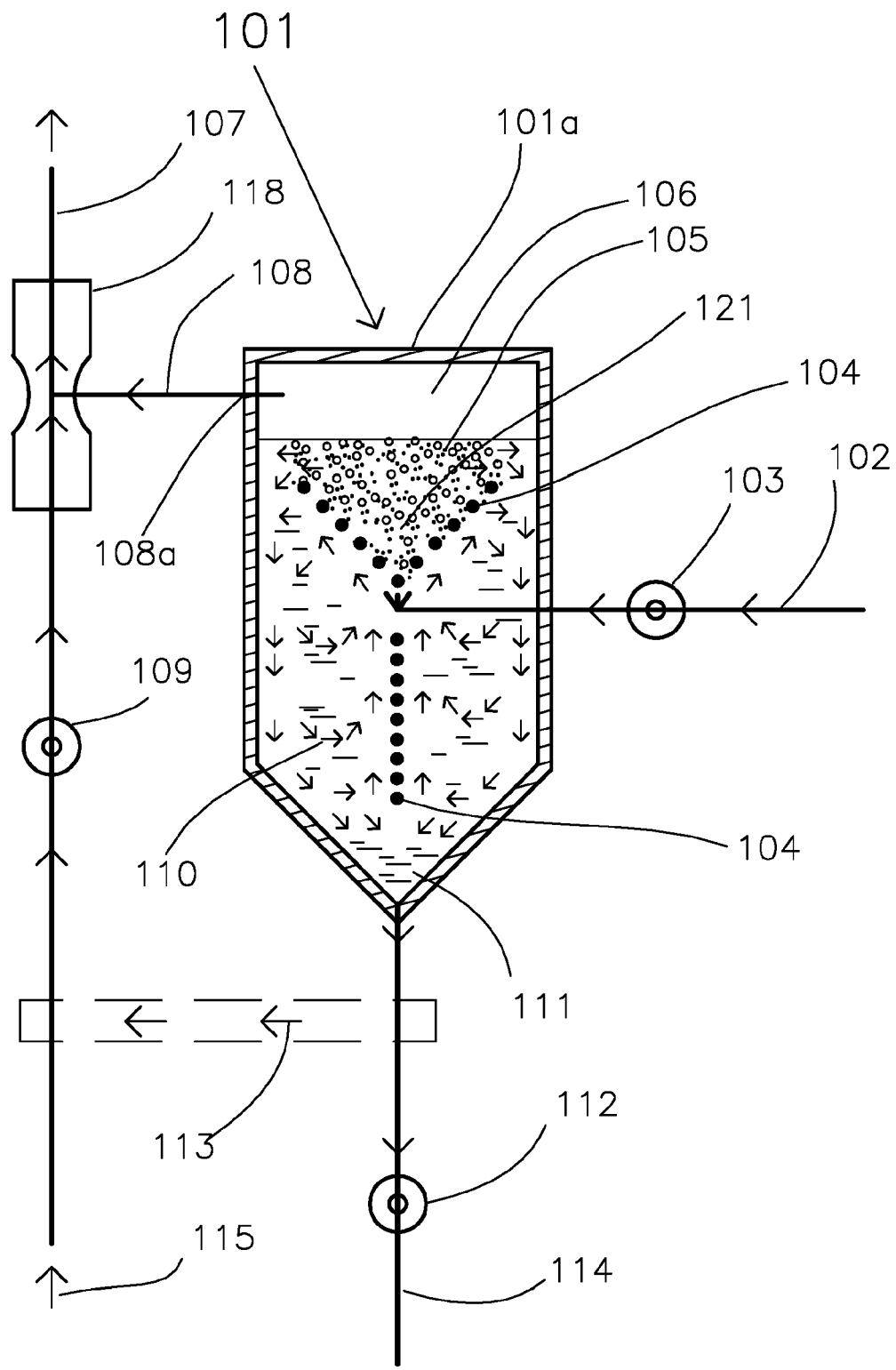
FIG. 2 is a diagrammatic view illustrating another example of the boiler apparatus and system including a venturi or other vacuum pumping system.

Referring to FIG. 2, there is shown a second example of the seawater boiler 101 in which like sequences of numerals (i.e 1, 101) generally denote like parts unless stated otherwise. In this example, the seawater boiler 101 is in fluid communication with a venturi 108. A pipe 102 delivers seawater (or other feedstock) to the boiler vessel 101a via pump 103 where it is injected into the boiling chamber 121 near the primary heating elements 104 to produce wet steam 105 which collects in the upper partially vacuumed chamber or headspace 106.

In more detail, the venturi 118 in communication with the outlet 108a of the boiler vessel 101 via pipe 108. The venturi 118 functions to reduce the pressure in chamber or head space 106 by means of air flow heated by a counter flow heat exchanger 113. Atmospheric air 115 is pumped through or sucked through the venturi 118 by pump/blower 109 to optimally saturate the air with wet steam which is ejected via outlet pipe 107 into the atmosphere at high velocity and or high volume as required in a rainmaking exercise. Other extraction devices such as Kinetic Vacuum pumps may be alternative to the venturi 118.

The boiler 101 is designed to maximise the possible seawater boiling rate by means of convection flow arrows 110 which transports the concentrated seawater to the base of the boiler 111 from where it can be extracted optimally. The air pump 109 may be located before or after the venturi 118. A variety of industrial venturi vacuum pumps may be incorporated. To enhance the convection process for rapidly concentrating saltwater 111, heating elements 104 may be arranged vertically as shown in FIG. 2. Most likely, the large quantity of wet steam required to emulate rain making may necessitate deployment of an aggregation of multiple boilers on an industrial scale, feeding output into local weather patterns, or relatively dry atmospheric jet-streams to create what meteorologists describe as "atmospheric rivers".

Referring now to FIG. 3, an example of a system 200 is shown including a third example of the continuous boiler 201 as shown in FIG. 1. In this example, the continuous boiler 201 may draw seawater from the ocean 251 as its feedstock and output the wet steam product to a steam drier/cleaner 250 and the concentrated product may output back to the ocean 251 or to a salt evaporation pond 252. The feed pump 203 and the boiler apparatus 201 may be powered by various energy sources including wind, and solar energy 253. A heat exchanger 218 may be provided.

The wet steam may be vented to the atmosphere as relatively wet steam, and/or be received by the steam drier 250 which may also be powered by various energy sources including wind and solar energy 253. The steam drier/cleaner 250 may provide a relatively clean and dry steam product to a condenser 254 that may in turn provide water to a domestic water supply 256 or as a feedstock for an electrolysis process 258 to produce oxygen and hydrogen. Precipitates of sea salt aerosols from the steam drier 250 are provided for salt and minerals processing 260.

It is noted that system 200 is one example of a system using the continuous boiler 201 and is included for example purposes only to provide a further use example of the seawater boiler 201.

Figure 4:
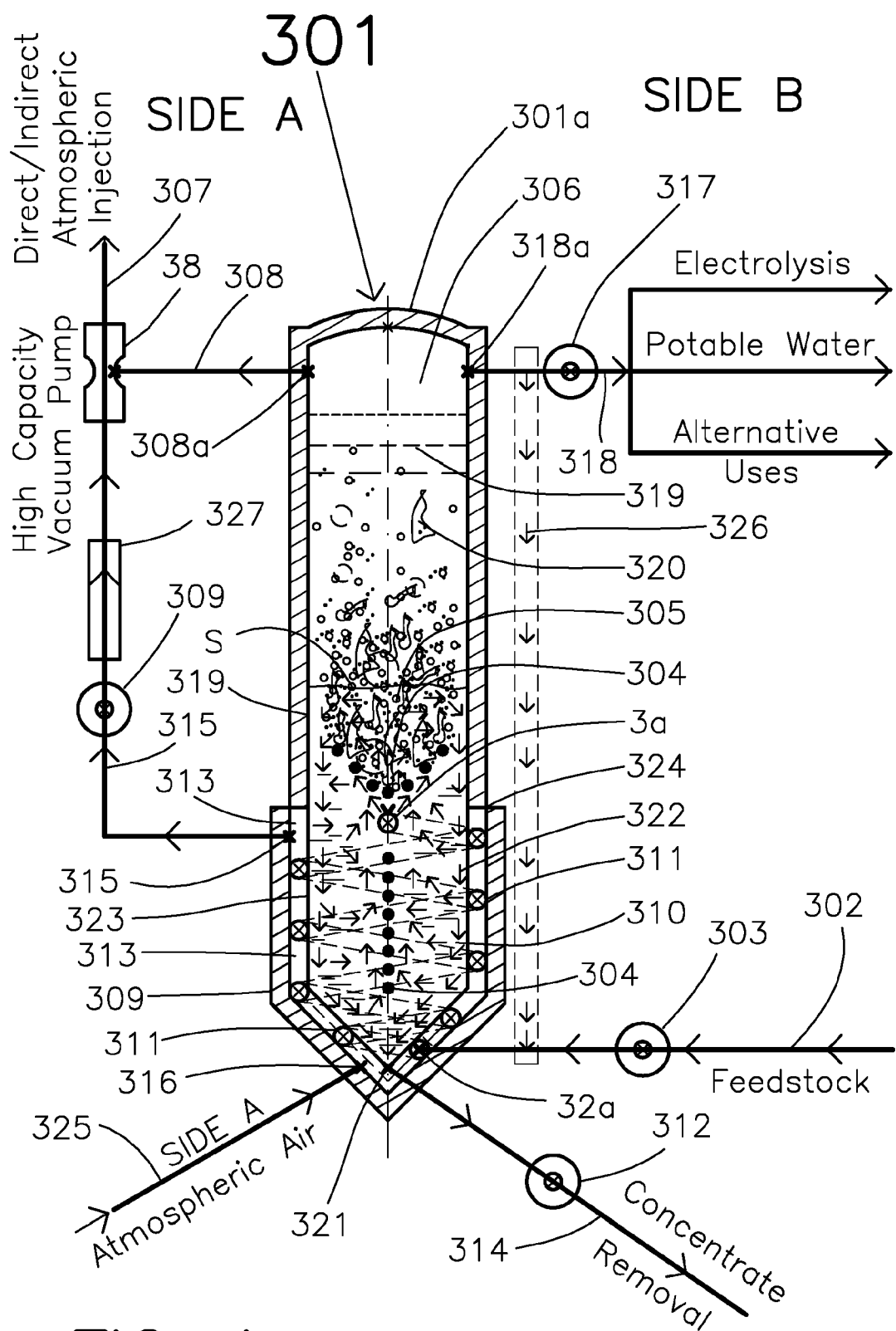
FIG. 4 is a diagrammatic view illustrating another example of the boiler apparatus and system which combines (a) SIDE A rain-making apparatus and (b) SIDE B output as feedstock for downstream clean water applications, into a single stand-alone unit, which can be switched between (a) and (b), as required.

Referring to FIG. 4, there is shown a fourth example of the seawater boiler apparatus 301 in which like sequences of numerals (i.e 1, 101, 301) generally denote like parts unless stated otherwise. In this example, the seawater boiler 301 is configured with Side A and Side B outputs being rain making and water product, respectively. The vessel 301a of the boiler apparatus 301 may be, but not limited to, 5 to 10 meters tall and may be transportable or fixed at site. The boiler apparatus 301 may generally be constructed of stainless steel or other suitable material.

"S" is the nominal surface of the seawater being boiled. With extremely vigorous boiling the surface "S" may not be readily apparent. Seawater volume sensors may be required to regulate and maintain the inflow and outflow in a substantially steady state. During extreme rates of boiling at say 60 or 70 deg. C., avoidance of large splashes of liquid concentrated seawater being drawn into the vacuum pumps 38 or 317 would be preferred. To minimise the quantity of salt-laden liquid sea water droplets being blown into the atmosphere via the venturi or high capacity vacuum pump 38 or into the clean water stream 318 via pump 317, a series of baffles 319 with progressively decreasing aperture may be utilised. A layer of stainless-steel wool may help control splashes.

Internally of the boiler vessel 301a and below the Surface "S", the heating elements 304 are provided in a similar manner to the previous examples that are arranged to fan outwardly toward the surface "S" and also extend downward to promote convection and separation of the concentrate at lower output 312a. The water may be boiled at about 70 degrees centigrade provided sufficiently low pressure is created within the boiler vessel 301a via operation of the pumps 317 and venturi or vacuum pump 38. The headspace 306 therefore being at less than atmospheric pressure. Boiling temperatures at less than atmospheric pressure may minimise the overall quantity of energy consumed when optimised.

In this example, the boiler vessel 301a of the boiler apparatus 301 includes a lower section 309a and an upper section (309b). The upper and lower sections 309a, 309b may be separable sections with bolted flanges at the plane of 324 for example, or some other option depending upon practical engineering considerations. In other examples, the lower section 309a may be hinger or otherwise be separable for maintenance within the lower section and also to, for example, access parts within the upper section 309b such as the heating elements 304.

In this example, the lower section 309a may include a heat exchanger chamber 313 incorporating spiral ducting, piping or similar 313 to maximise the heat transfer from descending 322 boiled seawater to the (a) incoming seawater feedstock 302 in spiral piping 311 and (b) incoming atmospheric air 325 in spiral chamber 313. Heat energy is transferred from the heated descending concentrated seawater 310 at the periphery of an internal vessel shell 323, to accelerate and maximise the potential rate of removal of concentrated brine 314 by means of the convection process. The cooler lower section 309a of the internal vessel shell 323 in conjunction with the lower internal heating elements 304a which assists the descending concentrated seawater convection process, flowing downwardly adjacent to the internal vessel shell 323 and toward the concentrate outlet 312a, and also assist to separate a lower convection zone from a boiling zone generally at or above the inlet 303a.

The heated air 315 is then drawn via the blower 321 and further heated by a heater 327 before entraining steam 308 via the venturi or high-capacity vacuum pump 38, before being outputted at 307. This may be considered as peripheral equipment used to create a vacuum and also provide the wetted air stream suitable for rain making.

Additional energy added to the atmospheric air 315 by means of heater 327 which controls the temperature of the air driving the venturi pump 38 vacuum, may be required to deliver the water payload from 307 to its intended altitude. It is noted that the high-capacity vacuum pump or venturi 38 may be a large atmospheric air driven venturi system with flow controls. Venturi or pump 38 may be described as a "Compressed air driven vacuum generator" or venturi vacuum pump operated in conjunction with an atmospheric air blower 327.

In general terms the greater the altitude required, the greater the energy requirements of the ejected water laden air. For low altitude transportation to close targets, additional energy input to the output 307 may not be necessary, depending upon atmospheric conditions to create a giant water sprinkler in effect. The air 315 driving the venturi vacuum pump 38 may be at a controlled temperature provided by the heater 327, greater than the entrained steam 308 to minimise premature condensation. The output temperature provided by the heater 327 may be considerably higher than ambient atmospheric temperature to provide the energy required for payload lift-off and delivery to intended altitude. Moisture added to passing higher altitude jet streams may be carried afar in accord with the meteorology.

Depending upon the humidity, temperature, and pressure, at any given point beyond the atmospheric air driven venturi vacuum pump 38, wet steam may vaporise, or dry steam condense depending upon variable combinations of temperature and pressure. Controlled in-pipe condensation beyond outlet 307 may include a method of controlling SSA (Sea Salt Aerosols) to be blown into the atmosphere to facilitate ultimate rainfall.

The feedstock is fed via pump 303 into piping 311 of the heat exchange chamber 313 before entering the boiler vessel 301*a* at 303*a* where the now warm feedstock is exposed to the heating elements 304. The output 318*a* may be above the baffle 319, and output 318 may be for freshwater creation and industrial uses such as electrolytic production of hydrogen and oxygen. The rate of steam production may be moderated relative to rainmaking mode, in accord with overall energy efficiency and practical usage.

Energy conserving heat exchange between Side B steam output 318 and seawater feedstock 302 may occur during condensation to recover latent heat and specific heat. The methodology may involve condensing steam prior to reaching holding tanks for example. Heat transfer via the heat exchanger 326 from output 318 to incoming feedstock 302 may be achieved by conventional means or otherwise.

When Side B is in operation substantially exclusively, with Side A arrested, rapid atmospheric airflow in chamber 313 may substantially cease. Then the majority of the counter flow heat exchange may occur with the feedstock 302 pumped through spiral piping 311 to the boiling chamber 305 at injection point 303*a*.

Each apparatus 301 rainmaking Side A single unit (or cluster) may be constructed to produce steam from a nominal 100 tonnes/hour of seawater, equivalent to boiling 2400 m3/day of liquid seawater, for example. Switching outputs between SIDE A and SIDE B wholly or in varying combinations simultaneously as required would permit substantially continuous operation of the Single Stage Flash Steam (SSFS) apparatus. When not making rain, the system would be desalinating to produce fresh water and vice versa. Side A and Side B may operate in unison if required.

Side A output 307 is for dedicated rainmaking from clusters of Silos adjacent to the source of seawater (or other) feedstock. A cluster of boiler apparatuses 301 engenders a rotating maintenance regime, to effect 24/365 output from a cluster as required. Thus, the boiler core apparatus may operate continuously, given a suitable power supply. Dedicated energy from solar energy farms and coastal wind farms to power arrays or clusters of desalination apparatus 301, is 21C preferred.

This example may be suitable as the "Continuous Flow Seawater Boiler" 201 in the flowchart shown in FIG. 3, for example.

It is envisioned that the overall energy requirements of the proposed SSFS (Single-Stage Flash Steam) desalination process (SIDE B) may be similar to the traditional MSFS (Multi-Stage Flash Steam) desalination process. Boiling temperatures at less than atmospheric pressure may minimise the overall quantity of energy consumed when optimised.

It is also envisioned that most of the energy involved in desalination only (Side B), would be recovered during heat exchange 326 to condense steam to water at ambient temperatures similar to MSFS.

And to, effect rainmaking, SIDE A would utilize all of the energy input to deliver the water load beyond output 307, to the atmosphere. There is no direct energy consumption comparison to be made with existing boiler technologies for desalination or high-pressure steam production other than for thermodynamic work done.

The Single-Stage Flash Steam (SSFS) boiler apparatus may be less prone to system instability due to power supply variability, than Multi-Stage-Flash Steam (MSFS) apparatus when reliant solar or wind energy supply dropouts arise. For example, rebooting the system for single stage operation is a simpler concept than for MSFS desalination systems where carefully controlled pressure drops across multiple stages must be maintained for best continuous operation. The SSFS invention allows for quick reboots compared with MSFS in the event of power failure. Relatively quick start-up of industrial processes generally has multiple virtues.

Referring now to FIG. 5, there is provided another example of a single stage boiler apparatus 501 for continuously processing a fluid such as water containing dissolved matter. The fluid may be, but not limited to, seawater or wastewater and the dissolved matter may be salt or other minerals. In this example, seawater is used as the example fluid. This example is adapted for a high air volume output 514 to the atmosphere and rain making.

The boiler apparatus 501 may include a boiler vessel 515 with an inlet 530, a first outlet 517, a second outlet 529, and a third outlet 511, and one or more heating elements 522 located within boiler vessel 515. The first and third outlets 517, 511 are located toward the top of the vessel 515 to provide a wet steam product and the second outlet 529 is located toward the bottom of the vessel 515 to provide the concentrate product. It is noted that one of the first and third outlets 517, 511 may be selectively closed or may be omitted so that there may be one or two outlets open simultaneously. in the upper portion of the vessel 515 An automatic default, atmospheric pressure relief valve may be required to allow head space 516 to return to atmospheric pressure in the event of a sudden system shutdown, to avoid external air pressure causing catastrophic structural damage due to a collapse of the chamber 501 primarily.

The boiler vessel 515 and the one or more heating elements 522 are arranged to provide a wet steam product 520 at the first outlet 517 and third outlet 511 and create convection, indicated by arrows 506, within the boiler vessel 515 such that a concentrate product 503 is provided at the second outlet 529 which is relatively lower than the first outlet 517 and third outlet 511.

In more detail, the inlet 530 is connected to an intake pipe 501 with a pump 502 configured to deliver seawater to the outer vessel chamber 525 where the upward arrows 525*a* indicate the rising flow of the seawater feedstock becoming progressively hotter as heat is conducted from the inner chamber 506. In effect a contra-flow heat exchanger delivers heated feedstock to the boiling chamber 522 via substantially, radially arranged inlet pipes 524. Preheated feedstock 525 is fed into the boiling chamber 521 via one or more integrated inlets 523 substantially centred, or otherwise arranged to facilitate the low temperature boiling and subsequent convection process. In this example, the location of the integrated inlets 523 is generally intermediate within the vessel 515 and set below a typical surface "S" of the fluid within the boiler vessel 515.

As the (seawater) feedstock boils vigorously, its salt concentration increases rapidly, making it denser, thus tending to create a gravitational downward flow 506b, accelerated by convection currents 506a. The most efficient counter-flow heat exchange occurs as heat is conducted through the inner wall 515a of the boiler vessel 515 to heat the feedstock 525.

Within the boiler apparatus 501, the one or more heating elements 522 may be variously arranged to allow the convection currents 506a to deliver the denser concentrated salty water to the bottom 503 of the boiler vessel 515 which may be considered a concentrate zone. Gravity also assists the concentration. A baffle 504 or similar may be provided and in some examples heated to facilitate the convection process within the lower inner chamber 506. The denser concentrated salty water may then be extracted at the second outlet 529. The baffle 504 may be centrally arranged and be positioned below the one or more primary heating elements 522. The baffle 10 may terminate short of the concentrate zone near the bottom 503 of the inner chamber. The overall order of component arrangements may be varied to suit practical design parameters.

The wet steam 520 produced rises to the upper chamber or head space 516 of the boiler vessel 515 from where it can be extracted at the third outlet 511 by vacuum pump 513 and delivered to intended usage via pipe Pressure regulation of the head space 516 may be accomplished by means of variable control of the vacuum pump 513 or an automatic pressure relief valve. The rate of evaporation may be controlled by the steam output of vacuum pump 513 reducing the pressure in the chamber 516 to maintain a substantially steady state boiling point below normal atmospheric pressure boiling point. The one or more heating elements 522 may be concentrated above the pre-heated feedstock inlet 523 to create a boiling zone 521 above the inlet 523 and below the upper chamber or head space 516. The one or more heating elements 522 may be provided in a Y shape in cross section, or other suitable shape. The boiling zone is above a convection zone 506 substantially below the inlet 523 region.

Boiler water level control would be maintained preferably in a substantially steady state, achievable by means of balancing pump 502, seawater 501 inflow and steam/water vapour extraction vacuum pumps 513 or 518. Some or all, of the extracted steam/water vapour may be delivered to secondary or tertiary uses via alternative vacuum pump 518 to maximise thermodynamic efficiency including heat exchange, depending upon proposed usage of the output.

Increased saltwater density due to boiling also contributes to concentrating the saltwater flow towards lower region 503 to where it can be removed substantially continuously from the base second outlet 529 of the inner chamber 506 of boiler vessel 515 via pipe 526 and returned via pump 527 to the source of the feedwater, such as the ocean where the concentrated discharge 528 would dissipate, or elsewhere as required.

Baffle(s) or heating elements 504 may be used to facilitate convection currents and flow patterns depending upon the arrangement of primary heating elements 522 and heat exchange with incoming feedstock 525a. Heating elements, in lieu of baffle 10 may be advantageous. As a result of the vigorous low temperature boiling process, the salt concentration increases rapidly, making the solution denser and tending to settle it towards the bottom 503 of the vessel 515 from where it can be extracted at outlet 529 optimally.

In order to utilise wet stream 514 or 614 from the boiler apparatus 501 or 601 for secondary purposes that require the removal of some or practically, all of the Sea Salt Aerosols (SSA), then further treatment of the wet steam output may be required. Sea Salt Aerosols (SSA) which normally accompany water evaporating from an ocean for example, would also be present in the wet steam output of the primary stage of the boiler apparatus 501.

The apparatus 501 may be deployed to provide water steam (a) injection into the lower atmosphere in a rainmaking program; (b) injection into the upper atmosphere to make solar energy reflecting ice as an Albedo (planetary reflectivity) increasing, global cooling program; (c) condensate for industrial usage such as domestic water supply, (d) condensate for electrolysis to produce hydrogen and oxygen for industrial usage, (e) condensate for any other usage requiring relatively pure water, may be achieved by a variety of existing methods. Most likely, the large quantity of wet steam required to emulate rain making would necessitate deployment of multiple boilers on an industrial scale.

A simple method of achieving much cleaner water vapour, for example, may include: Multistage purifying to high degrees would be feasible also. As the condensed steam output from the first boiler would contain relatively low concentrations of Sea Salt to become the feedstock for a successive boiler processing, as required, then practically clean steam may be obtained. Thus, condensate from a second processing may have a degree of purity satisfying high potable water standards, suitability for electrolysis and other uses.

Referring to FIG. 6, there is shown yet another example of the seawater boiler 601 in which like sequences of numerals (i.e 501, 601) generally denote like parts unless stated otherwise. In this example, the seawater boiler 601 has an additional heat exchange jacket or chamber 615b surrounding the feedstock heating chamber 625. Thus, a parallel flow heat exchanger for the incoming air 605a may be incorporated depending upon thermodynamic considerations. To facilitate the convection process for rapidly concentrating saltwater, heating elements 604 may be arranged vertically or otherwise to increase circulation flow rates.

The venturi vacuum pump 613 functions to reduce the pressure in chamber or head space 616. The venturi vacuum pump 613 is in communication with the outlet 611 of the boiler vessel 601 via pipe 612. Air 605a heated by parallel flow heat transfer from chamber 625 to outer chamber 615b. The atmospheric air 605a is pumped through the venturi 613 by pump/blower 608 to optimally saturate the air with wet steam which is ejected via outlet pipe 614 into the atmosphere at high velocity and or high volume as required in a rainmaking exercise. Additional heat may be added to the air flow by heater 610 to provide the energy required to transport large volumes of steam/water vapour laden air to the altitude preferred in accord with the meteorology. A variety of industrial vacuum pumps may be incorporated although air driven venturi vacuum pumps may be preferred as they can be scaled in size and function relatively easily to suit outputs required.

The boiler 601 is designed to maximise the possible seawater boiling rate by means of convection flow 606a arrows which transports the concentrated seawater 603 to the base of the boiler outlet 629 from where it can be extracted optimally. Typically, counterflow heat exchangers (531, 631) between feedstock in and output to clean water output would be incorporated. Similarly, counterflow heat exchangers to conserve heat energy from the concentrated output (526, 626) would be incorporated in an optimised system.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

The invention claimed is:

1. A boiler apparatus for continuously processing water containing dissolved matter, the boiler apparatus including:
   a boiler vessel with an inlet, a first outlet and a second outlet; and
   a heating element located within the boiler vessel,
   wherein the boiler vessel and the heating element are arranged to provide a wet steam product at the first outlet and create convection within the boiler vessel such that a concentrated product is provided at the second outlet which is relatively lower than the first outlet,
   wherein the boiler vessel includes a head space, a heating zone relatively below the headspace and a convection zone relatively below the heating zone, the heating zone including the heating element to provide the wet steam product to the headspace and the convection zone including at least one of a vertically arranged further heating element and a vertically arranged baffle that are arranged to promote convection within the convection zone, and
   wherein the headspace is adapted to accumulate the wet steam product and the first outlet is located toward a top of the headspace.

2. The boiler apparatus according to claim 1, wherein the head space is at least partially depressurised, less than atmospheric pressure to reduce the boiling point.

3. The boiler apparatus according to claim 2, wherein the boiling point is reduced to less than about 70 degrees centigrade.

4. The boiler apparatus according to claim 1, wherein the boiler apparatus includes an extraction pump in fluid communication with the first outlet.

5. The boiler apparatus according to claim 1, wherein the boiler vessel narrows toward its bottom end and the second outlet is located at the bottom end.

6. The boiler apparatus according to claim 1, wherein the further heating element at least partially vertically divides the boiler vessel.

7. The boiler apparatus according to claim 1, wherein the further heating element includes a plurality of vertically arranged heating elements.

8. The boiler apparatus according to claim 1, wherein the baffle at least partially vertically divides the boiler vessel.

9. The boiler apparatus according to claim 1, wherein the baffle terminates short of the second outlet providing a concentrate zone proximate to the second outlet.

10. The boiler apparatus according to claim 1, wherein the boiler vessel includes an array of heating elements located in the heating zone of the boiler vessel and includes the baffle extending at least partially between the heating zone of the boiler vessel and into the convection zone of the boiler vessel.

11. The boiler apparatus according to claim 1, wherein the input is arranged to discharge at a submerged location between a top and a bottom of the boiler vessel.

12. The boiler apparatus according to claim 11, wherein the input is arranged to discharge intermediate to the top and bottom of the boiler vessel.

13. The boiler apparatus according to claim 1, wherein the boiler apparatus includes a heat exchanger between the input and the second outlet.

14. The boiler apparatus according to claim 1, wherein flow rates of the inlet, first outlet and second outlet are configured such that the boiler apparatus operates continuously.

15. The boiler apparatus according to claim 1, wherein the dissolved matter is or includes salt.

16. The boiler apparatus according to claim 1, wherein the boiler vessel includes two outlets, including the first outlet and a third outlet, for the wet steam product.

17. The boiler apparatus according to claim 1, wherein the boiler vessel includes a heat exchanger about at least a lower section thereof.

18. The boiler apparatus according to claim 17, wherein at least some of the heating elements are positioned within the boiler intermediate the heat exchanger so as to provide a thermal gradient between the heat exchanger and heating elements.

19. A boiler apparatus for continuously processing a seawater feedstock the boiler apparatus including:
   a boiler vessel with a first inlet from which the seawater enters the boiler vessel, a second inlet for atmospheric air, two steam product outlets and a waste outlet;
   a heating element located within the boiler vessel;
   a first heat exchanger arranged to communicate heat between one of the two steam outlets and the seawater feedstock; and
   a second heat exchanger fitted to at least a lower section of the boiler vessel to communicate heat with seawater within the boiler vessel;
   wherein the boiler vessel and heating element are arranged to provide a wet steam product at the two steam product outlets and create convection within the boiler vessel such that a concentrated product is provided at the waste outlet which is relatively lower than the first outlet, and
   wherein the seawater feedstock is preheated by the first heat exchanger and then the second heat exchanger prior to entering the boiler vessel at the inlet; and
   wherein the atmospheric air is preheated by the second heat exchanger and then mixed with the wet steam product of the other of two steam product outlets to provide a wetted air stream.

* * * * *